(12) United States Patent  (10) Patent No.: US 8,556,341 B1
Connaughty  (45) Date of Patent: Oct. 15, 2013

(54) VEHICULAR SEAT SHOCK ABSORBING MODULE

(76) Inventor: Kenneth G. Connaughty, Peterson, MN (US)

( * ) Notice: Subject to any disclaimer, the term of this patent is extended or adjusted under 35 U.S.C. 154(b) by 364 days.

(21) Appl. No.: 12/924,509

(22) Filed: Sep. 28, 2010

Related U.S. Application Data

(60) Provisional application No. 61/340,905, filed on Mar. 23, 2010.

(51) Int. Cl.
*B60R 21/00* (2006.01)
*B60N 2/42* (2006.01)

(52) U.S. Cl.
USPC ............... 297/216.18; 297/216.16; 297/302.1

(58) Field of Classification Search
USPC .................. 297/216.1, 216.16, 216.18, 302.1
See application file for complete search history.

(56) References Cited

U.S. PATENT DOCUMENTS

| 3,100,617 | A | * | 8/1963 | Radke et al. .................. 248/430 |
| 3,853,298 | A |   | 12/1974 | Libkie |
| 4,408,744 | A | * | 10/1983 | Thompson .................... 248/636 |
| 4,475,707 | A | * | 10/1984 | Foster ........................... 248/636 |
| 5,294,085 | A |   | 3/1994 | Lloyd |
| 5,520,440 | A |   | 5/1996 | Lee |
| 5,577,790 | A |   | 11/1996 | Buell |
| 5,938,340 | A | * | 8/1999 | Brodersen ....................... 384/40 |
| 6,257,663 | B1 |  | 7/2001 | Swierczewski |
| 6,357,830 | B1 |  | 3/2002 | Ratza |
| 6,742,838 | B1 |  | 6/2004 | Swierczewski |
| 6,851,747 | B2 |  | 2/2005 | Swierczewski |
| 7,922,142 | B2 | * | 4/2011 | Koutsky et al. ............... 248/424 |

* cited by examiner

*Primary Examiner* — Sarah B McPartlin
(74) *Attorney, Agent, or Firm* — M. Paul Hendrickson

(57) ABSTRACT

The present invention provides a unique shock absorbing module which, when attached to a vehicular seat and chassis, exhibits unexpected superior effectiveness in reducing the effects of impacting shocks emanating from the operation of a vehicle. The shock absorbing system includes shock absorbing members disposed within a guide track supported by support frame. A slideable carriage with tracking members such as wheels saddling onto the shock absorbing system serves to immediately transfer and absorb any impacting forces exerted multidirectionally against the carriage member and a vehicular seat mounted thereto.

20 Claims, 16 Drawing Sheets

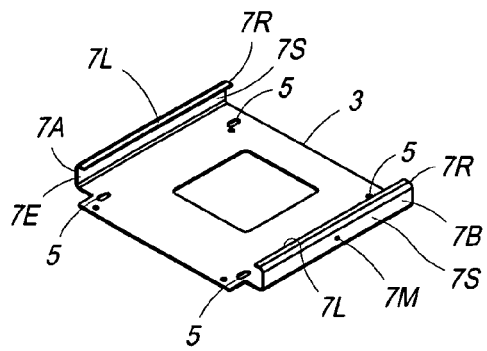
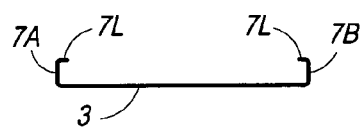
FIG. 3    FIG. 4
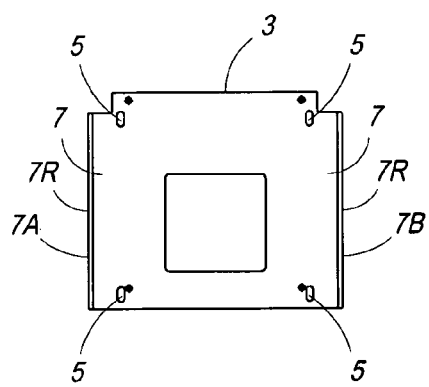
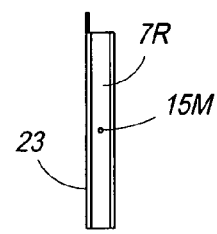
FIG. 5    FIG. 6
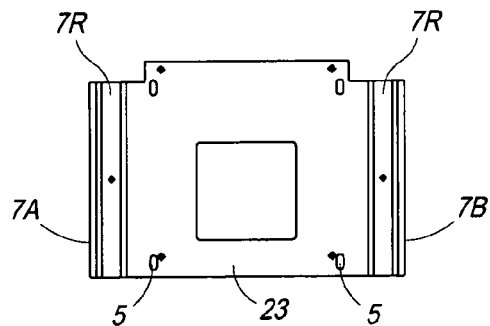
FIG. 6A

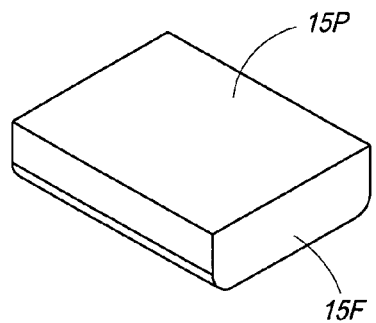 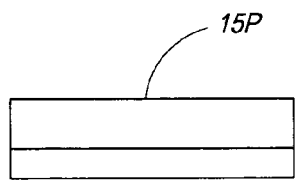
FIG. 11   FIG. 11A
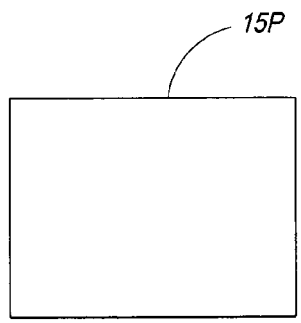 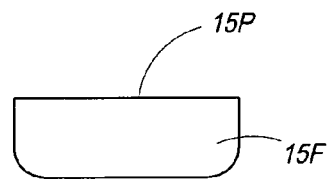
FIG. 11B   FIG. 11C

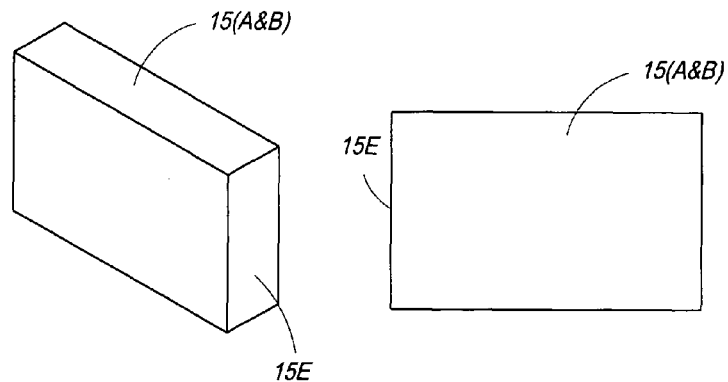
FIG. 14  FIG. 14A
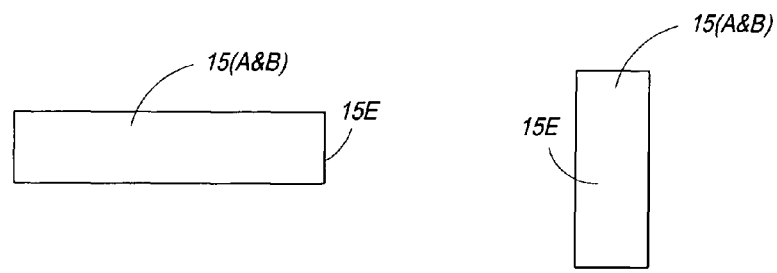
FIG. 14B
FIG. 14C

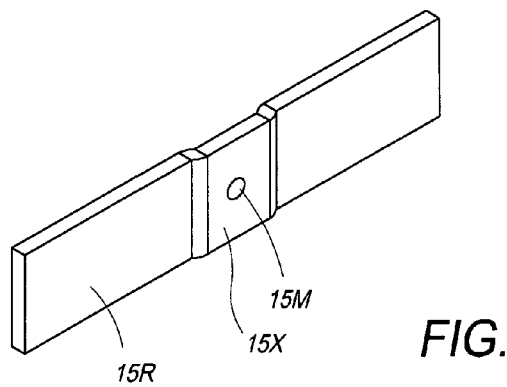
FIG. 15
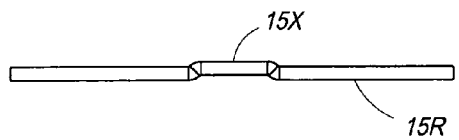
FIG. 15A
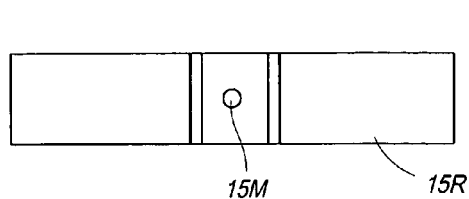 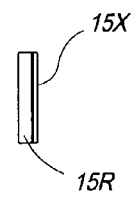
FIG. 15B        FIG. 15C

VEHICULAR SEAT SHOCK ABSORBING MODULE

This application is a non-provisional application of earlier filed provisional application No. 61/340,905, entitled "Vehicular Seat Shock Absorbing Module", filed on behalf of Kenneth G. Connaughty, on Mar. 23, 2010, the contents of which are incorporated by reference herein.

FIELD OF INVENTION

The present invention relates to shock absorbers and more particularly to vehicular shock absorbers.

BACKGROUND OF THE INVENTION

It is conventional to equip vehicular seats with shock absorbers to absorb the abrupt impacting forces invariably encountered in the operation of a powered vehicle. Certain motorized vehicles, such as modern automobiles, are adequately equipped with shock absorbing suspension systems to effectively reduce vehicular impacting forces. Other vehicles such as farm and garden tractors, skid steers, ATV, heavy duty trucks, earth moving equipment, ambulances, riding lawn mowers, etc., provide little, if any, shock absorbing systems to effectively absorb and protect a vehicular occupant from impacting shocks. This commonly leads to physical impairment or injury to the unprotected vehicular occupant. Consequently, countless effective work hours and vehicular operational time are lost by reason of the hazardous conditions created by unarrested vehicular shocks. The unprotected vehicular operators are unnecessarily plagued with chronic back problems and other shock induced injuries which often lead to permanent or disabling injuries.

Typical seat shock absorbing units conventionally rely upon vertically suspended or mounted springs, hydraulic and pneumatic systems to absorb vehicular shock impacts. Unfortunately, these vertically arresting systems, when applied to a vehicular seat, are generally costly, ineffective, as well as, being excessively bulky and too cumbersome to effectively serve as a vehicular seat shock absorber. There exists a need for an effective, relatively inexpensive and compact vehicular seat shock absorbing unit and especially in a module form which may be readily adapted to conventional vehicular seats.

SUMMARY OF THE INVENTION

The present invention provides a vehicular seat shock absorbing module which may be utilized as an auxiliary unit for mounting onto a conventional vehicular seat or as seat absorbing module directly integrated into the construction of the vehicular seat. The shock absorbing module provides unexpected superior efficacy in absorbing vehicular seat impacting forces. The shock absorbing module may be appropriately equipped with support frame for mounting the shock absorbing module to a vehicular chassis. The support frame includes a carriage track with the shock absorbing unit operationally affixed thereto. The carriage track slideably engages and tracks the carriage member which upon initiation of an external impacting force causes the carriage member to operationally engage the shock absorbing system or section. A vehicular seat may be appropriately adapted to mount onto the carriage member so as to profit from the exceptional shock absorbing efficacy of the shock absorbing module.

Unlike conventional vehicular seat shock absorbing systems, the present invention relies upon a transfer of an impacting force to a compressible shock absorbing unit possessing sufficient shock absorbing capacity to responsively compress and typically absorb the full force or impact of the impacting force and then responsively return to its original uncompressed form after effectively absorbing the impacting force. The seat shock absorbing module utilizes a carriage member for initiating a transfer of the impacting force onto the shock absorbing section. The shock absorbing system may suitably include paired impacting absorbing members which compressively absorb the impacting force and upon fully absorbing the impacting force undergo a gradual or sequentially decompression to its relaxed or normal uncompressed state. This effectively allows the carriage member to quiescently return to its original non-impacting position. The seat shock absorbing unit or module is mounted to support frame which mounts onto a vehicular chassis and slideably supports the carriage member. A rigid stop serves to separate two oppositely facing or positioned compressible shock absorbers (e.g. elastomeric pads) which operationally independently react to receive and absorb an impacting force as may be directionally exerted thereupon. The slideably mounted carriage member transfers the impacting force exerted upon the carriage member to shock absorbing members. The two oppositely positioned compressible shock absorbers also serve as counter-balancing shock absorbers so as to dampen or reduce abrupt aftershock or a shock bouncing effect upon its return to the normal uncompressed state after absorption of the initial impacting shock. The carriage member may be appropriately tracked along by a pair of tracking members (e.g. rollers) which saddle a pair of oppositely facing impact absorbing members. The carriage track for tracking the carriage member may be installed within the support frame which includes mounts for mounting the shock absorbing unit onto the vehicular chassis as well as supportively carrying the carriage member.

The carriage member may include rollers mounted thereupon which slideably track upon the carriage track. The carriage member is responsive to impacting forces encountered during the vehicular operation and will concurrently slide within the carriage track in an opposite direction to the direction of the inflicted impacting force thereupon and thereby effectively and concurrently transfer the impacting force onto the shock absorbing members. The distance the carriage member traverses is limited by the positioning by the tracking members relative to the shock absorbing section. This creates an immediate response to the impacting shock which substantially diminishes the actual and perceived effect of the impacting shock because of the relatively short distance the carriage member needs to traverse in order to effectively absorb the impacting shock. Unlike conventional seat shock absorbers, the carriage and carriage track affords a multidirectional transfer, reception and absorption of impacting forces inflicted upon the directionally oriented resilient shock absorbers. The cooperative interaction between the two oppositely positioned shock absorbing members serves not only to absorb the impacting shock but also to dampen the recoiling effect by effectively absorbing the rebounding or decompressive forces by compressively absorbing such residual forces onto an oppositely positioned shock absorbing member.

BRIEF DESCRIPTION OF THE DRAWINGS

FIG. 3 is an isometric top view of a support frame for the module shown in FIG. 1.

FIG. 4 is a frontal view of FIG. 3.

FIG. 5 is a top view of FIG. 3.

FIG. 6 is a side view of FIG. 3.

FIG. 6A is a perspective bottom view of a steel stock blank for forming the FIG. 3 support frame.

FIG. 11 is an isometric side view of a shock dissipating member shown in FIG. 2.

FIG. 11A is a side view of FIG. 11.

FIG. 11B is a top view of FIG. 11.

FIG. 11C is an end view of FIG. 11.

FIG. 14 is an isometric side view of a shock absorbing pad shown in FIG. 2.

FIG. 14A is a top view of FIG. 14.

FIG. 14B is a lengthwise side view of FIG. 14.

FIG. 14C is an end view of FIG. 14.

FIG. 15 is an isometric side view of a mounting bracket shown in FIG. 2.

FIG. 15A is a side view of the bracket shown in FIG. 15.

FIG. 15B is a top view of FIG. 15A.

FIG. 15C is an end view of FIG. 15B.

DETAILED DESCRIPTION OF THE INVENTION

Figure 1:
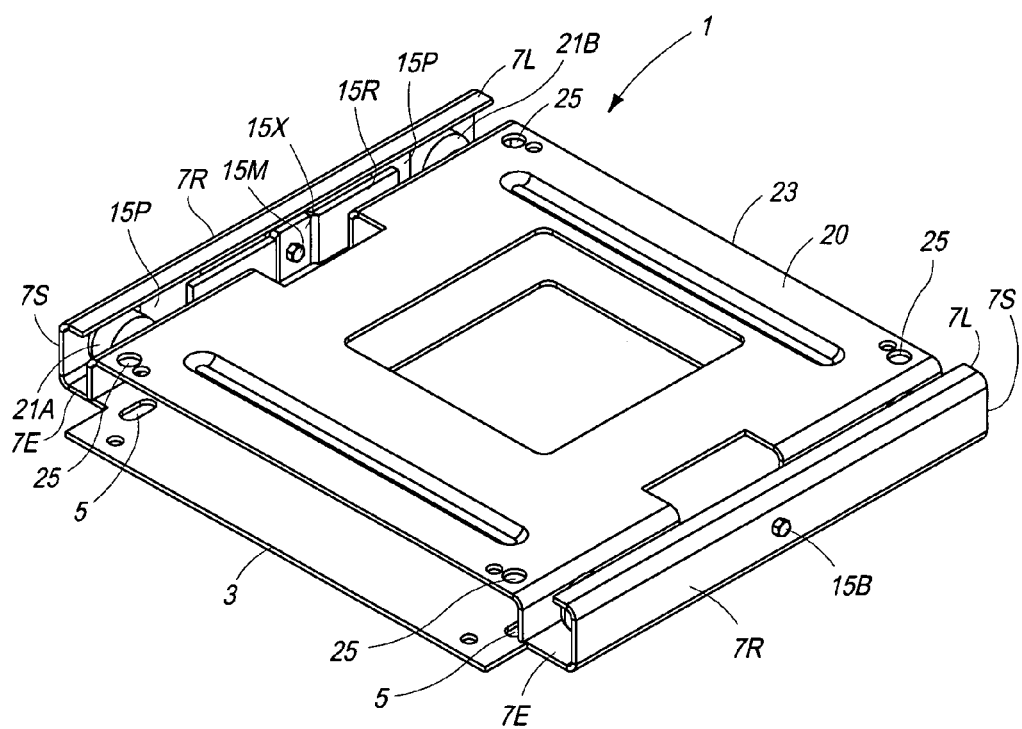
FIG. 1 is an isometric top view of an assembled multidirectional vehicular seat shock absorbing module of this invention.

The present invention provides a unique vehicular shock absorbing module 1 possessing surprisingly superior efficacy in absorbing shock impacting forces emanating from multiple directions of impact. This feature is particularly useful because impacting forces emanating from multi-directions are persistently inherent in any vehicular operation and especially with respect to those vehicles V adapted for use upon unpaved roads and rough terrain. The shock absorbing module 1 includes a unique shock absorbing section 15 comprised of a number of relatively inexpensive component parts which cooperatively serve to provide an unexpectedly superior shock absorbing module 1 for any vehicular support adapted to transport vehicular objects such as vehicular seats S and other supportive devices used to transport vehicular occupants and objects. Unlike conventional shock absorbing systems which typically rely upon vertically positioned responsive shock absorbers, the shock absorbing sections 15 of the module 1 may be effectively longitudinally aligned to coincide with the vehicles path of travel or in a horizontally positioned relationship so as to absorb oppositely directed impacting forces and therefore become more effective in absorbing the impacts of the shock.

With reference to the accompanying FIGS. 1-20, the shock absorbing module 1 is equipped to dampen and absorb impacting shocks emanating from diverse impacting directions and exerted upon a vehicular support for a host of transported objects such as the depicted vehicular seat S. As may be observed from the disassembled module of FIG. 2, the shock absorbing module 1 comprises:

A) a support frame 3 equipped with:
1) chassis mount 5 for mounting the support frame 3 to a vehicular chassis V;
2) a shock absorbing section 15 mounted to the frame 3 with the shock absorbing section 15 including at least two oppositely positioned resilient shock absorbing members 15A & 15B separated by a rigid stop 15S so as to permit each of the shock absorbing members 15A & 15B to independently compress upon absorption of an incoming impacting force and thereafter relax to an uncompressed position; and
3) a guide track 7 positioned in longitudinal alignment with said shock absorbing section 15; and B) a carriage member 20 slideably mounted to operationally engage onto the guide track 7, with said carriage member 20 including:
1) a carriage frame 23;
2) a supportive mount 25 for mounting a weight bearing supportive structure to the carriage frame 23; and
3) a tracking member (generally prefixed by 21) affixed onto said carriage frame 23 for slideably tracking onto said guide track 7 with each of said tracking member 21A & 21B being oppositely positioned in a juxtapositional relationship to each impacting face 15f of the shock absorbing section 15 so as to concurrently transfer an impacting shock exerted against the carriage member onto the shock absorbing section.

Figure 19:
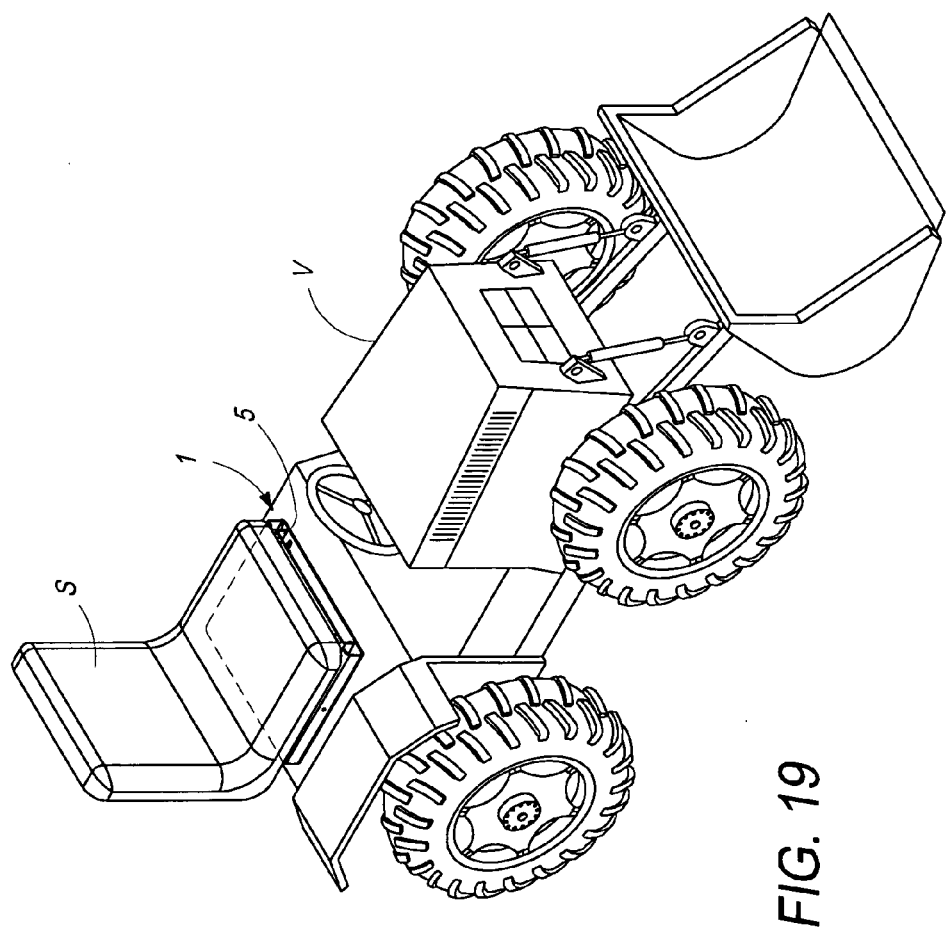
FIG. 19 is a perspective side view depicting the vehicular seat shock absorbing module shown in FIG. 1 mounted to a vehicular seat and chassis.

The shock absorbing module 1 is adapted to dampen vehicular impacting forces which inherently arise during the normal operational use of a vehicle. The shock absorbing module 1 may be incorporated into a wide range of weight bearing structures 25 or vehicular supports for transporting objects and especially for those vehicular supports in which there exists a need to reduce and dampen the effect of vehicular impacting forces. The module 1 may be combined for uses in which it is desirable to protect the transport of fragile materials from the impacting and damaging forces or for other protective reasons such as health, safety and welfare considerations of a vehicular occupant. The shock absorbing module 1 is especially adapted for use in combination with vehicular human occupancy or supportive structures such as benches, seats, stretchers, beds, etc. with a particularly useful application as a vehicular seat shock absorbing module 1 as depicted in FIG. 19.

The shock absorbing section 15 may comprise multiple shock absorbing sections 15 each of which includes at least two oppositely positioned (or directed) resilient shock absorbing members 15A & 15B terminated by a rigid stop 15S so as to permit each of said shock absorbing member 15A & 15B to independently compress and absorb an impacting force and thereafter relax to an uncompressed position after fully absorbing and dampening the impacting force. The oppositely positioned shock absorbing members 15A & 15B of the shock absorbing section 15 include impacting receiving ends 15E which are directionally positioned so as to receive incoming impacting forces inflicted thereupon by a biasing movement of a sliding carriage member 20 thereupon and then to absorb the incoming impacting energy within the compressive confinement of confining zone 15C housing the paired resilient members such as the elastomeric members 15A & 15B as depicted in the FIGS. 1-2, 14-14C, 16-18 and 20. If desired, a single shock absorbing section 15 equipped with two oppositely positioned shock absorbing members 15A & 15B of sufficient size and absorptive capacity to absorb impacting shocks emanating from multiple directions may be utilized for this purpose. The shock absorbing members 15A & 15B may be confined within a single guide track 7 or housed in multiple guide tracks 7 terminated by a stop 15S and operationally connected to the carriage member 20 tracking onto tracking members 21 so as to concurrently transfer an incoming impact force onto the shock absorbing members 15A & 15B. A more comprehensive and uniform absorption and dampening of impacting shocks may be effectuated by laterally positioning two or more opposing paired shock absorbing sections 15 at a sufficient lateral displacement from one another so as to effectively and uniformly transfer the impacting force exerted against the supportive structure S onto each shock absorbing section 15. Positioning the two impact absorbing sections 15 so as to engage upon the tracking member 21A & 21B at opposing guide track ends or seat ends will generally suffice for this purpose. The shock absorbing section 15 may alternatively involve an arrangement of a plurality of shock absorbing sections 15 aligned in a plurality of longitudinal or radial directions therefrom so as to respectively receive and absorb impacting forces in reciprocating alignment thereto or positioned so as to responsively absorb forward and backward shocks and, if desired, sidewise impacting shocks. If desired, a plurality of the shock absorbing sections 15 could accordingly be placed in arcuate or radial arrangement so as to receive and respond to impacting forces emanating from radially different sources. With particular reference to FIGS. 1-20, the bilateral shock absorbing module 1 depicted herein is equipped with a pair of laterally positioned shock absorbing sections (generally prefixed by 15) each of which may appropriately include a pair of oppositely positioned shock absorbing pads 15A & 15B separated by a rigid stop 15S. Stop 15S allows for the oppositely positioned pads 15A & 15B to independently receive and directionally stop an incoming impacting force from either opposing directions. If desired, the bilaterally shock absorbing module 1 depicted by FIGS. 1-2 and 16-19 may be combined by stacking and transversely mounting another vehicular seat shock absorbing module 1 (not shown) so as to absorb sideway impacting shocks. The top module 1 would mount onto the seat S and the bottom transversely positioned module 1 would mount onto the chassis V and the top module 1 as may be visualized from FIG. 19. As may accordingly be perceived, the basic shock absorbing section 15 may be combined in a number of different ways to suppress impacting shocks emanating from multiple radial planes.

The rigid stop 15S forms a rigid backing against which shock absorbing pads 15A & 15B compress against when subjected to an impacting force. The rigid stop 15S may be constructed of any rigid material (e.g. rigid plastics, metals, etc.) firm enough to provide the necessary firm backing onto which the shock absorbing members 15A & 15B confiningly compress against when subjected to an incoming impacting force. The depicted stop 15S may be suitably constructed of an aluminum block or any other appropriate rigid material. A stop anchoring orifice 15o permits the rigid stop 15S retained within retaining bracket 15R to firmly be anchored or bolted to support frame 3 via rail bolt receiving aperture 7o to the side rails 7R. This may be accomplished by threading threaded bolt 15T onto the threaded shock absorbing mount 15M of the retaining bracket 15R as depicted in FIGS. 1, 2, 16-18, and 16A-18A. The rail 7R and retaining bracket 15R in cooperative association with stop 15S form a confining zone or chamber 15C which confines the compressive action of elastomeric pads 15A & 15B.

The modular device 1 includes a carriage unit 20 slideably mounted so as to operationally engage onto a guide track section 7. The carriage unit 20 comprises a carriage frame 23 and a supportive mount 25 for mounting a supportive vehicular structures such as vehicular seat S to the carriage frame 23. In addition, the carriage unit 20 includes tracking members (generally prefixed by 21) affixed onto said carriage frame 23 for tracking onto the guide track section 7 and straddling the shock absorbing sections 15. As may be visualized from FIG. 19, the supportive seat mounts 25 mounts the vehicular seat S onto the carriage unit 20 so that seat S concurrently moves along the guide track 7 with the tracking members 21A & 21B as the carriage unit 20 responsively reacts to an incoming impacting force. This arrangement concurrently transfers the incoming impacting force exerted upon the carriage unit 20 onto the shock absorbing section 15 of module 1. Each tracking member 21 (i.e. 21A & 21B) is operationally positioned so as to be in an immediate juxtapositional relationship to each initiating impacting face 15f of each shock absorbing section 15 so as to concurrently react against any impacting force inflicted thereupon. With reference in particular to FIGS. 1, 16-18, and 16A-18A, the slideably mounted shock dissipating block 15P uniformly and concurrently transfers the pressure or energy of the impacting force as exerted thereupon by the respective tracking members 21A & 21B onto the shock absorbing pads 15A & 15B. Since there exists no operational gap within the slide tracking member components 21A & 21B and the shock absorbing section 15 components, each of the oppositely positioned shock absorbing units 15A & 15B will immediately cushion any impacting forces emanating from different directions and particularly those oppositely directed impacting forces impinging thereupon.

As may be further observed from the Figures, the shock absorbing section 15 may be affixed onto the support frame 3 in a shock absorbing position by retaining bracket 15R bolted onto side rail 7R of support frame 3 with threaded bolt 15T. Retaining brackets 15R bracket and retain the shock absorbing pads 15A & 15B against their respective side rails 7R so as to longitudinally limit the compression and decompression of elastomeric pads 15A & 15B within the confinement of a confining zone 15C which is longitudinally confined and defined as being housed within track section 7 by the retaining bracket 15R, side rail 7R, stop 15S and shock dissipating pads 17. A guide track system 7 supported by the support frame 3 and positioned in longitudinal alignment with the shock absorbing unit 15 thus serves to track and guide an incoming impacting force exerted upon carriage member 20 from either longitudinal direction onto the appropriate shock absorbing pad (15A or 15B) of shock absorbing section 15.

With each longitudinal movement of the slideably mounted carriage unit 20 along guide track 7, the shock absorbing section 15 will operationally and concurrently abate the impact of any incoming impacting force thereupon. Accordingly, it may be observed that when track following rollers 21A & 21B are utilized as tracking members 21 to slideably engage the carriage unit 20 onto track 7, any movement of the rollers 21A & 21B as well as any movement of carriage member 20 will be correspondedly restricted to the extent of compressive movement of pads 15A & 15B against stop 15S. In order to achieve a more uniform distribution and transfer of the impacting force from rollers 21A & 21B onto compression pads 15A & 15B, substantially rigid shock dissipating members or pads 15P typically of a cross-sectional face substantially larger or mating onto that of the interfacing shock absorbing pads 15A & 15B may be effectively utilized to effectuate a substantially uniform transfer and distribution of the impacting shock from wheels 21A & 21B onto the shock absorbing pads 15A & 15B.

Figure 2:
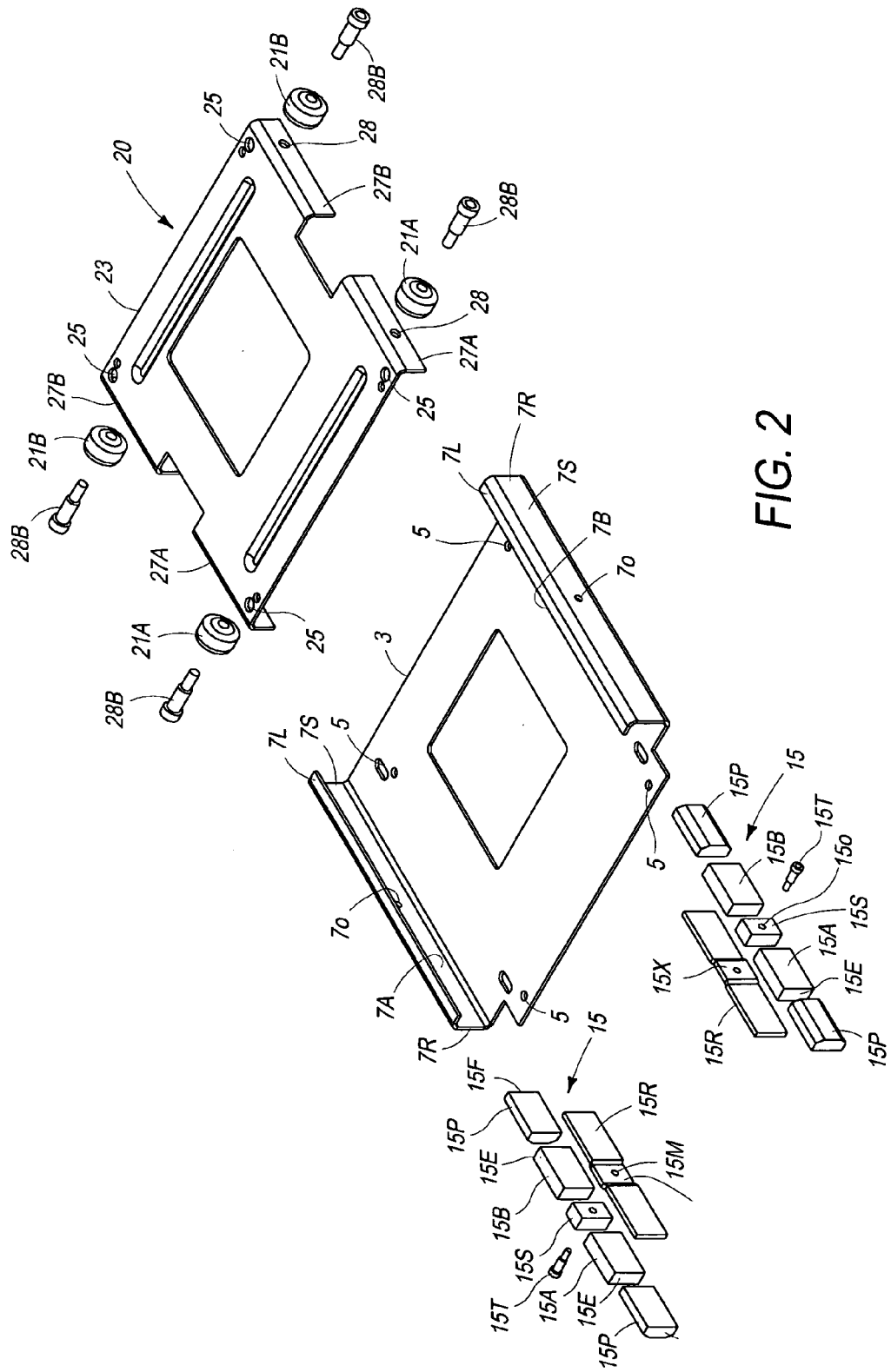
FIG. 2 is a disassembled isometric view of the shock absorbing module shown in FIG. 1.
Figure 7:
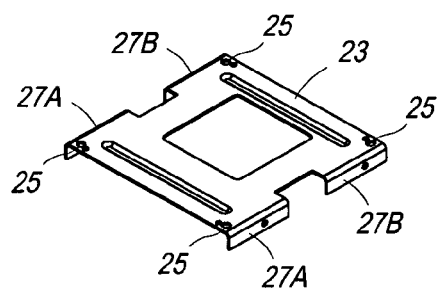
FIG. 7 is an isometric side view of a shock transferring carriage frame shown in FIG. 1.
Figure 8:
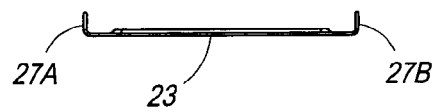
FIG. 8 is a reverse frontal view of FIG. 7.
Figure 9:
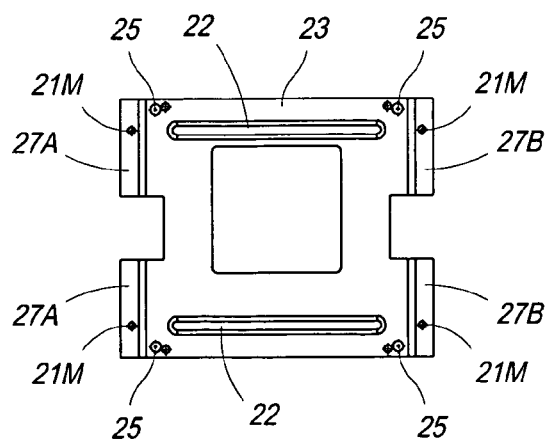
FIG. 9 depicts a top view of a steel sheet blank for fabricating the carriage member depicted in FIG. 7.
Figure 10:
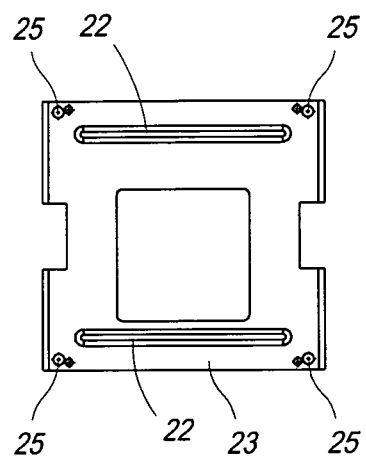
FIG. 10 is a bottom view of FIG. 7.
Figure 12:
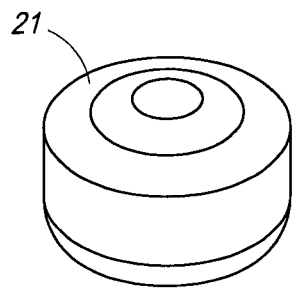
FIG. 12 is an isometric top view of a plastic roller wheel shown in FIG. 2.
Figure 12A:
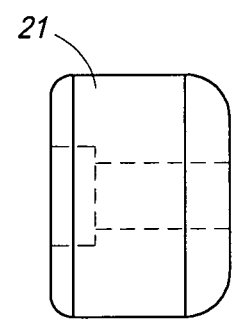
FIG. 12A is a frontal side view of FIG. 12.
Figure 12B:
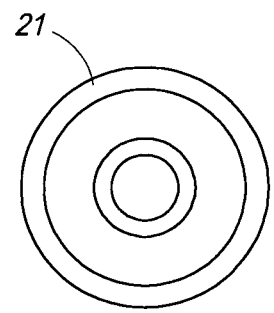
FIG. 12B is a top view of FIG. 12.
Figure 12C:
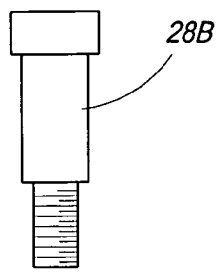
FIG. 12C is a side view of a roller wheel shaft bolt shown in FIG. 2.
Figure 12D:
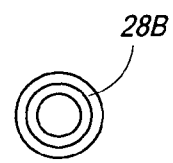
FIG. 12D is a bottom view of FIG. 12C
Figure 12E:
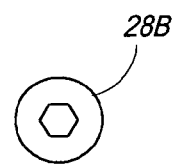
FIG. 12E is a top view of FIG. 12C.
Figure 13:
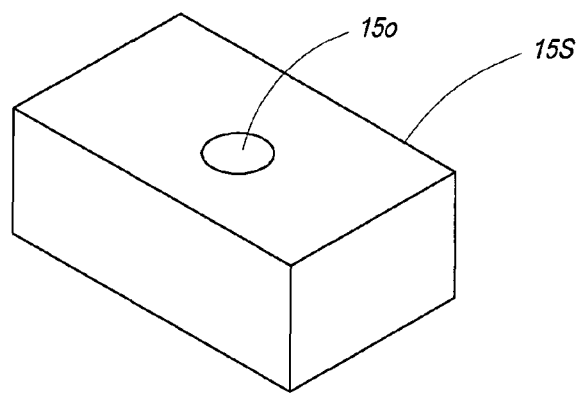
FIG. 13 is an isometric top view of a shock absorbing stop shown in FIG. 2.
Figure 13A:
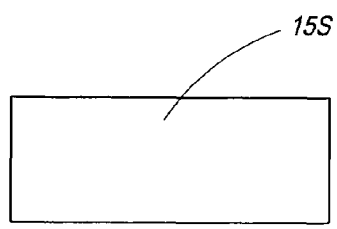
FIG. 13A is a side view of FIG. 13.
Figure 13B:
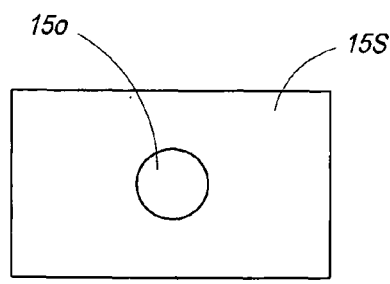
FIG. 13B is a top view of FIG. 13.

With reference to the Figures and particularly the unassembled vehicular seat shock absorbing modular unit 1 of FIG. 2, the modular unit 1 includes a support frame 3 equipped with chassis mounts 5 for mounting the support frame 3 onto a vehicular chassis V. Highly effective shock absorbency may be achieved by absorbing forward and backward emanating shocks as particularly depicted by the FIGS. 16-18, 16A, 16B, and 16C by utilizing a support frame 3 equipped with a pair of laterally disposed tracks 7 terminated by guide rail sections 7A & 7B positioned along a peripheral side margin of support frame 3. The rail sections 7A & 7B are depicted as including laterally positioned upwardly extending sidewalls 7S terminated by inwardly extending lip tops 7L which serve to retain tracking wheels 21A & 21B in guide tracks 7. The terminal ends 7E of rail sections 7A & 7B may be appropriately of an open construction so as to permit the installation of the tracking members 21 or wheels 21 and shock absorbing section 15 of carriage unit 20 therewithin. The support frame 3 as particularly depicted in FIGS. 3-6 includes shock absorbing bores or mounts 7o for mounting the shock absorbing retaining brackets 15R and the laterally disposed shock absorbing stopping members 15S thereto, with the shock absorbing resilient pads 15A & 15B and shock dissipating pads 15P being firmly secured onto the rail side walls 7S of rail sections 7A & 7B by retaining bracket 15R.

As may be further observed from FIGS. 1-2, 16-18, 16A, 16B, and 16C, the depicted shock absorbing module 1 is shown as consisting of two laterally positioned shock absorbing sections 15 restrained at the appropriate shock absorbing positions by retaining brackets 15R mounted onto guide rail section 7A & 7B by threaded bolt 15T bolted onto bolt mount 15M or threaded nut 15M. As may be further illustratively observed from FIGS. 16-18 including the cross-sectional views (16A, 17A, and 18A) thereof, each shock absorbing section 15 includes a pair of shock dissipating pads or members 15P which upon tangential contact by the impacting of carriage wheels 21A & 21B against their respective impacting faces 15f will then uniformly dissipate or transfer the incoming impacting force onto the impacting receiving ends 15E of shock absorbing pads 15A & 15B which are then confiningly forced to uniformly compress against impacting stopping member 15S within the confinement of confining zone 15C so as to thereby effectively absorb the energy of each impacting shock as directionally exerted against each oppositely positioned shock absorbing pad 15A & 15B of the shock absorbing section 15. The stop 15S in conjunction with rail 7, side rail 7S and the retaining bracket 15R defines a confining zone or chamber 15C so as to effectively confine and longitudinally direct an incoming impacting force towards stop 15S forcing the impacted shock absorbing member or pad (15A or 15B) to longitudinally and confiningly compress within said confining zone 15C. By longitudinally confining the impacting force within a shock absorbing confining zone 15C, the effectiveness of shock absorbing pads 15A & 15B to absorb and arrest the impacting shock within the confinement of the confining chamber 15C is significantly enhanced. Upon compression and absorption of the energy or force created by an incoming impacting force, the impacted resilient pad (15A or 15B) in response to the directionally exerted impacting force will confiningly compress within the confining zone 15C and then responsively return smoothly to a relaxed and uncompressed position within the confining chamber or zone 15C and thereby effectively reposition the shock section 15 and the tracked carriage member 20 to its original uncompressed position in readiness to smoothly absorb the next ensuing impacting force.

The carriage member 20 as depicted in FIGS. 1-2, 6-9 and 16-18 inclusive of 16A-16C, is equipped with two shock absorbing sections 15 each bracketed with impacting responsive tracking members 21 collectively depicted as a pair of laterally positioned tracking wheels 21A & 21B straddling and interfacially contacting each shock absorbing section end 15E. These tracked wheels 21 are identified by their respective positional interrelationship to resilient pads 15A & 15B as respectively 21A & 21B. Tracking wheels 21A & 21B slideably engage carriage unit 20 onto the guide rail sections 7A & 7B in a saddling arrangement with each shock absorbing section 15. The carriage unit frame 23 is further depicted as being equipped with a pair of laterally disposed rail sidewalls 27A & 27B which provide the tracking wheel mounts 28 for tracking wheels 21A & 21B. Guide rails 7A & 7B in cooperative association with the fixed lateral positioning of carriage rail sidewalls 27A & 27B thus provide a pair of laterally and vertically extending disposed track rails for confining the longitudinal tracking of tracking wheels 21A & 21B within guide track 7. Tracking wheels 21A & 21B may be appropriately mounted onto carriage unit frame 23 with threaded wheel mounting bolts 28B bolted onto a threaded wheel mount 28 of carriage member 20 which are laterally positioned thereupon so as to respectively snuggly saddle wheels 21A & 21B onto the shock dissipating pads 15P at each end 15E of each shock absorbing section 15. Vertical containment of tracking wheels 21A & 21B within guide track 7 as well as the shock absorbing section 15 is provided by the guide rail retaining lips 7L of guide rails 7A & 7B and the track floor 7F provided by supportive frame 3.

Figure 16:
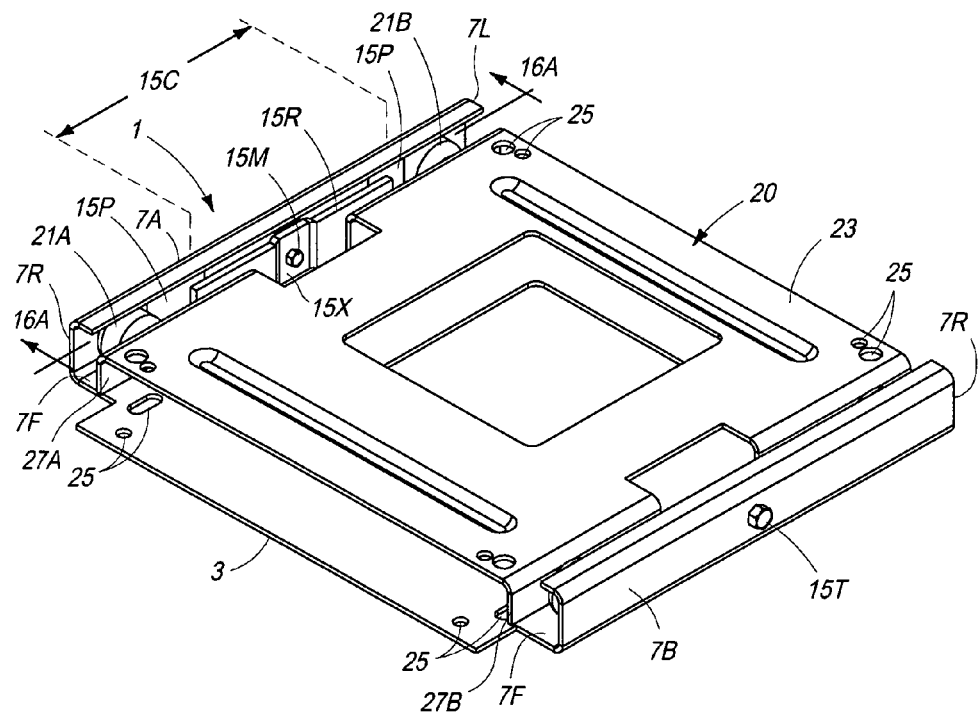
FIG. 16 is an isometric top view of the shock absorbing module shown in FIG. 1 depicting the shock absorbing section in a non-compressed or relaxed condition.
Figure 16A:
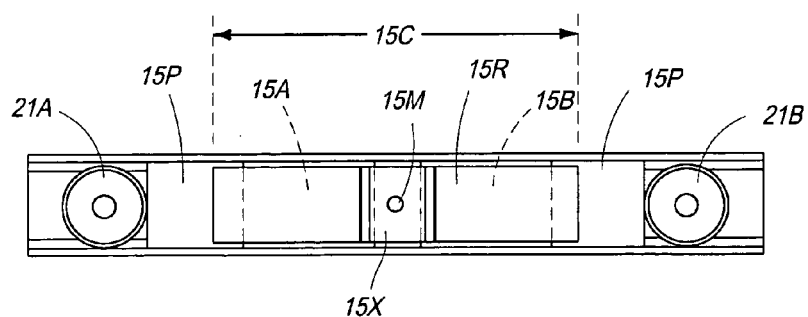
FIG. 16A is a bisecting cross-sectional view taken along lines 16A-16A of FIG. 16.
Figure 17:
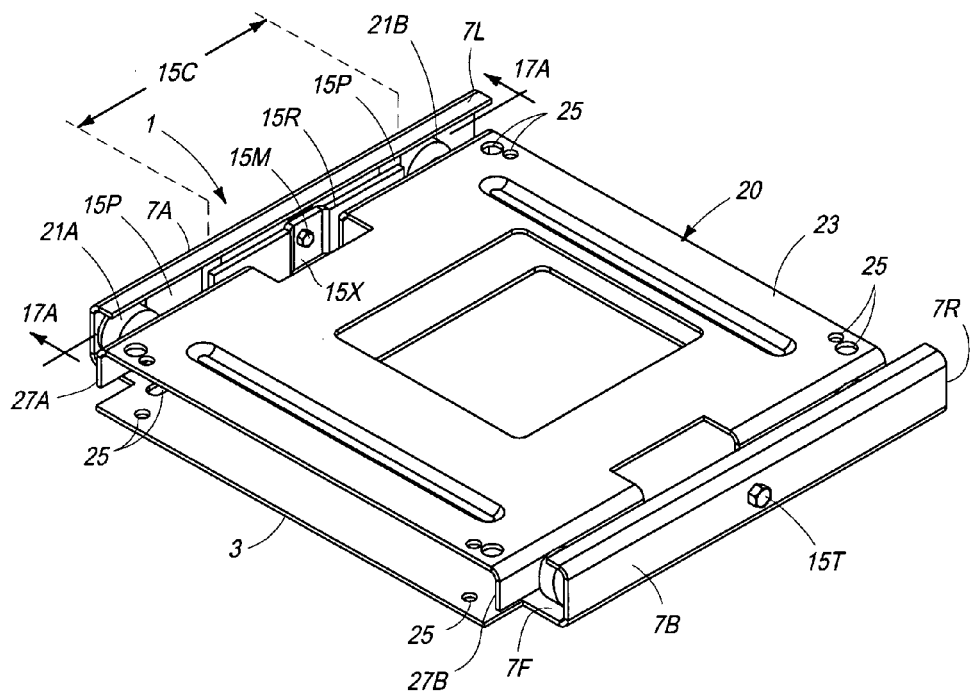
FIG. 17 is an isometric view of FIG. 16 depicting the shock absorbing module in a compressive backward position in response to a frontal impacting force.
Figure 17A:
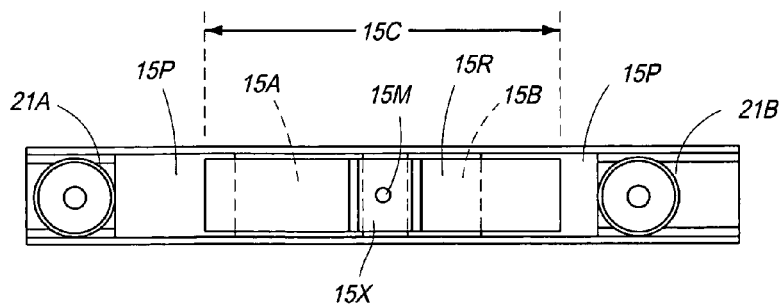
FIG. 17A is a bisecting cross-sectional view taken along line 17A-17A of FIG. 17.
Figure 18:
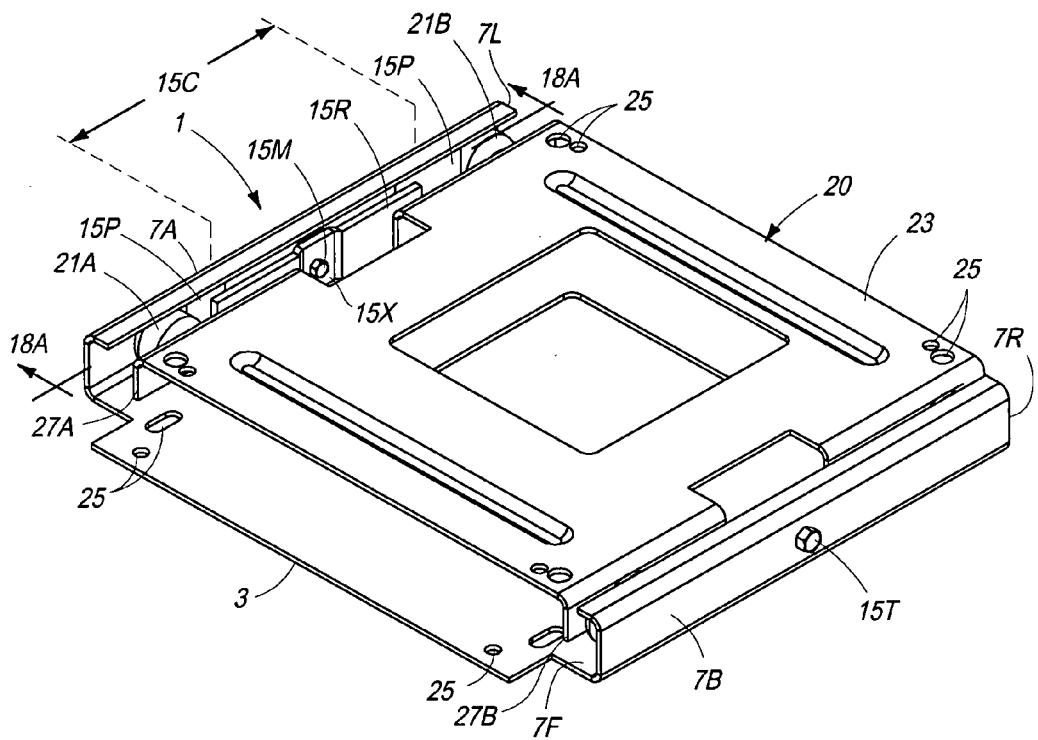
FIG. 18 is an isometric top view illustrating the shock absorbing module of FIG. 16 absorbing an impacting force from an opposite direction from the FIG. 17 depiction.
Figure 18A:
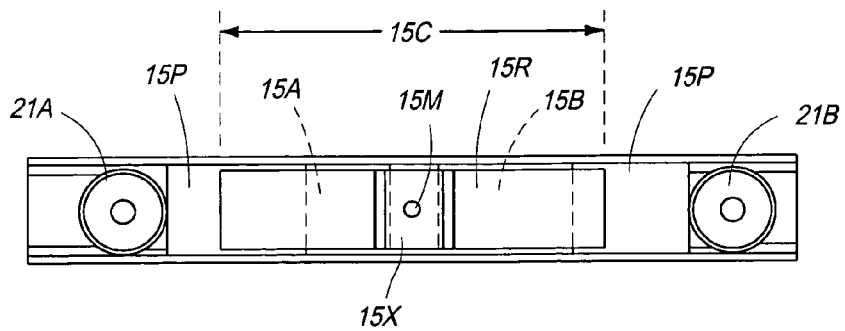
FIG. 18A is a bisecting cross-sectional view taken along 18A-18A of FIG. 18.

FIGS. 16, 17 and 18 and the corresponding bisecting cross-sectional views of FIGS. 16A, 17A, and 18A illustrate how the paired shock absorbing pads 15A & 15B react and cooperatively function to effectively absorb shock incoming impacting forces exerted from opposite directions. FIGS. 16 and 16A depict the shock absorbing unit 15 and the slideable carriage member 20 in a relaxed or non-impacting position. FIGS. 17 and 17A depict the effect of a forwardly impacting force exerted against carriage unit 20 wherein the tracking wheels 21A & 21B responsively move and track within guide track 7 to cause the two interfacing shock absorbing pad 15B to compress against stops 15S and thereby absorb the energy of the impacting force within the confinement of confining zone 15C. FIGS. 18 and 18A illustrate the compression of the two laterally positioned shock absorbing pads 15A and the decompression of the two shock absorbing pads 15B in counteracting an impacting force impacting the shock absorbing sections 15 from an opposite direction from that shown in FIGS. 17 and 17A.

It will be further observed that the positioning of the shock absorbing sections 15 in combination with the operational positioning of tracking wheels 21A & 21B within guides track 7 limits or restricts the longitudinal movement of the carriage member 20. In the absence of an impacting force as depicted by FIG. 16, tracking wheels 21A & 21B will operationally rest in an immediate juxtapositional or interfacing relationship onto each of the shock dissipating pads 15P with the respective abutting shock absorbing resilient pads 15A & 15B being shown as resting within the compression or confining zone 15C in an uncompressed or relaxed form. When an incoming impacting force is exerted against the carriage 20 (e.g. see FIGS. 17, 17A, 18 and 18A), the two shock absorbing pads (either 15A or 15B depending upon the impact force direction) in closest proximity to the incoming impacting force will be forced to compress while the two other oppositely positioned shock absorbing pads (15A or 15B) will remain uncompressed. If the impacting force is exerted atypically exceed the impact absorptive capacity or limit of pads 15A & 15B, the shock absorbing pads (15A & 15B) will accordingly decompress against the unspent excess energy forcing the correspondingly opposite carriage rollers 21A or 21B against the opposing dissipating pads 15P to thereby cause the compression of the oppositely positioned shock absorbing pads 15A & 15B (whichever case it may be) so as to thereby further damp, retard and absorb the effects of the excessive initiating impacting force thereupon.

Since the total movement distance of carriage unit 20 is longitudinally limited, the shock absorbing module 1 via the unique dual cooperative interaction of pads 15A & 15B of the shock absorbing section 15 readily dampens and absorbs the impacting forces with unexpectedly superior efficacy. Upon encountering an impacting blow, the longitudinal movement of the vehicular seat mounted onto the carriage member 20 will traverse such a relatively short distance (while still effectively absorbing the shock) so that the vehicular operator will consciously detect only a slight seat S movement effect in counteracting the overall force of the impacting shock. By transferring a substantial portion and most commonly substantially all of the impacting force to an interfacing surface 15E of the impacting absorbing pads 15A & 15B within a confined zone 15C, the impacting force absorption capacity of the impacting pads 15A & 15B surprisingly becomes substantially more effective than that which is customarily perceived and accomplished with conventional seat shock absorbers. This superior shock absorbing efficacy allows the size of shock absorbing section 15 as well as the overall shock absorbing module 1 size to be significantly reduced to a smaller and more compact size than conventional seat shock absorbing systems.

The configuration of the shock absorbing pads 15A & 15B further contributes to the shock absorbing efficacy of the shock absorbing section 15. The interfacing impact receiving cross-sectional surface area 15E of shock absorbing pads 15A & 15B need not be excessively large in order to achieve exceptional shock absorbency efficacy within a relatively short shock absorbing distance. Vehicular seats of a larger and a heavier construction may require a somewhat larger shock absorbing interfacing surface and pad 15A & 15B capacity to compensate for the overall seat size and weight in comparison to the smaller sized seats.

The size and shock absorbing characteristics of the shock absorbent pads 15A & 15B will reflect upon the efficacy of the pads 15A & 15B within the confining zone 15C to effectively retard the overall effects of an impacting force. Since there exists definitive advantages in achieving optimum shock absorption within the limited movement range of carriage member 20, certain elastomeric materials have been found to be better suited to serve as the shock absorbing pads 15A & 15B. Pads 15A & 15B should posses sufficient resistance against breakage, abrasion, attrition as well as compression so as to withstand the repetitive impacting forces that a vehicular seat S typically encounters during its normal operational use over a prolonged period of usage. The shock absorbing pads 15A & 15B size and configuration of the elastomeric materials required to achieve shock absorbing efficacy will also differ amongst the various different types of elastomeric materials. The extent of cross linkage for any given elastomeric material reflects upon the compressive and decompressive characteristics of most elastomeric materials. In general, excessively cross-linked elastomeric materials tend to possess an excessive hardness which in turn tends to inhibit their elastomeric usefulness as a shock absorbing material while the too lightly cross-linked elastomers cushion prematurely and possess too little compressive resistance to be of any practical use. Most typically, the intermediate or medium cross-linked elastomeric materials afford the necessary compressive and decompressive attributes within a confined compression zone 15C for effective use as shock absorbing pads 15A & 15B. The elastomeric field includes a host of material and synthetic rubbers embracing a broad range of cross-linked elastomeric materials which are incorporated herein by reference to the listing thereof in wwww-.wikipedia.org/wiki/elastomers.

The length of the pads 15A & 15B for any given cross-sectional size will also reflect upon the actual and perceived force of the impacting shock discerned by the vehicular operator. By utilizing pads 15A & 15B possessing the more effective shock absorbing compression and decompression properties, the carriage unit 20 movement distance coupled with the actual compressive distance pads 15A & 15B are required to compress to effectively absorb the shock can be significantly reduced and the shock absorbing efficacy enhanced by using elastomeric pads 15A & 15B capable of absorbing substantial shock forces within a compressive distance of less than 2 inches and particularly those exhibiting less than about 1 inch of compression when subjected to 78 pounds of weight. If the compression characteristics of pads 15A & 15B are insufficient, the impacting force will be more detectable because the impacting force will be prematurely transferred to stop 15S causing a jolting sensation to the seat occupant. Conversely, to rigid pads 15A & 15B will fail to absorb the impacting energy by prematurely transferring the force onto the supported object or seated occupant. The shock absorbing pads 15A & 15B useful herein are typically characterized as having a substantially longer track or compressive length than their width and depth which length characteristic is generally reflected in the required compressive distance needed in order to more effectively and more fully absorb the force of the incoming impacting force.

The utilization of elastomeric pads 15A & 15B within the confinements of confining zone 15C necessitates a confining chamber 15C which controllably confines the compression and decompression of elastomeric pads 15A & 15B in a manner which allows concurrent compression within the confining zone 15C upon impact but also allows the elastomeric pads 15A & 15B to responsively decompress after absorbing the impacting force therewithin. The ability concurrently absorb forces upon impact and immediately decompress after absorbing the impacting force provides for a smooth transition from the unstabilizing effects of the impacting shock while also restabilizing the carriage 20 to a stabilized operative condition. This unique ability transforms a severe impacting force into a smooth stabilized carriage ride.

Without adding sufficient clearance within the confining zone 15C to permit concurrent compression and an immediate response to decompress upon absorption of the impacting force, the jolt of the impacting force would remain unarrested by the shock absorbing section 15. This arises because the compressed elastomeric pads 15A & 15B become wedged within the confining zone 15C which instead of abruptly decompressing after an impacting compression causes the compressed pads 15A & 15B to remain stuck within the confining zone 15C. Thus, instead of the almost instantaneous return to the decompressed state, the compressed pads 15A & 15B will remain compressed (often for several minutes) without permitting the carriage 20 to smoothly return to its original carriage position as illustrated in FIGS. 16 and 16A. By allowing adequate clearance between the side rails (7A & 7B) and the retaining brackets 15R, the elastomeric pads 15A & 15B will be allowed to abruptly compress and readily decompress and thereby provide a smoothly transitioned shock absorption cycle.

The confining zone 15C clearance as afforded the elevated section 15X of retaining bracket 15R provides sufficient room to permit an abrupt, but smooth, compression of pads 15A & 15B within the confining zone 15C and a concomitant rapid but smooth decompression of pads 15A & 15B. As depicted in the Figures, this may be accomplished by incorporating an elevated retaining bracket section 15X within a centralized section of retaining bracket 15R. As may be observed this elevated retaining bracket section 15X faces inwardly in juxtaposition to stop 15S of the shock sections 15 to provide sufficient clearance within the confining chamber 15C so as to allow elastomeric pads 15A & 15B to compress upon impact and then upon full absorption of the impacting force to orderly decompress smoothly and rapidly onto its original uncompressed state. The confining zone clearance section 15X does not necessarily need to be directly incorporated into the retaining bracket 15R but may be provided in any other suitable form which provides sufficient longitudinal clearance between the rail 7R and the retaining bracket 15R. Accordingly, washers, spacing inserts, expansion plates and the like may be also utilized to provide sufficient clearance within the confining zone 15C to allow pads 15A & 15B to concurrently compress upon impact and abruptly decompress after the impacting compression cycle. Determination as to whether or not sufficient longitudinal confining zone clearance may be readily detected by an inability of the elastomeric pads 15A & 15B to quickly return to their decompressed form.

The carriage 20 does not require substantial movement in order to effectively absorb an impacting blow and then return to its initial stabilized or normal position. Reducing the carriage 20 movement distances when encountering an impacting shock arises primarily because of the shock absorbing efficacy of the shock absorbing section and the positioning of the tracking members 21. Operationally, the elastomeric pads 15A & 15B absorb a substantial quantum of impacting force within a relatively short compression distance. In tests conducted on the shock absorbing module 1 depicted by FIGS. 16-18, 16A, 16B, and 16C, there typically exists from less than about 2 inches to at least ⅛ inch compression when the carriage 20 is subjected to a 78 pound compression force is six pound increments. More typically, the carriage 20 movement with more effective elastomeric pads 15A & 15B will range from about ¼ inch to about 1 inch under 78 pounds of compressive force added in six pound increments. This represents unexpectedly superior shock absorbing efficacy over conventional systems. More specifically, tests conducted upon a median density, closed cell, low compressive set silicone rubber (item #OSA 1135-500) elastomeric pads 15A & 15B described in greater detail hereinafter afforded exceptional efficacy in absorbing impacting forces as evidenced by only by providing a movement ranges from about ½ inch to about ¾ inch compression movement under a 78 pound compression force applied in six pound increments. This particular silicone rubber pad when used as the elastomeric pads 15A & 15B were capable of limiting the carriage 20 movement at about a ⅛ inch movement at 6 pounds of force followed by a 1/16 inch movement with each of the next successive four incremental increases of 6 pounds added thereto, with the next 6 incremental increases of 6 pounds each causing only a 1/32 inch incremental movement with each six pound increment followed by the $12^{th}$ incremental increase of 6 pounds causing only a 1/64 inch carriage 20 movement and then the final $13^{th}$ incremental increase of 6 pounds resulting in no additional compressive movement of the pad. After 10 minutes with the full 78 pound complement of weight, a maximum movement of 13/16 inches was observed. It may be accordingly observed that substantial shock absorbency efficacy may be accomplished by experiencing only a short movement distance of the carriage member 20.

In the wheeled carriage unit 20 construction as depicted in FIGS. 16-18 and 20, the tangential contact of the tracking wheels 21A & 21B within the shock absorbing section 15 in the absence of the shock dissipating pads 15 would tend to create a non-uniform transfer of the impacting force onto the impacting pads 15A & 15B. The shock dissipating pads 15P as particularly depicted in FIGS. 16-18, 16A, 16B and 16C are adapted serve a useful function by more uniformly transferring the tangentially impacting force exerted by wheels 21A & 21B by transferring the force substantially across the entire interfacing cross-sectional surface of the shock absorbing pads 15A & 15B. This more uniform distribution of impacting force in turn causes the shock absorbing pads 15A & 15B to uniformly compress not only across the interfacing cross-sectional surfaces 15E thereof but also contributes to the transfer of force to within the entire internal confines of the shock absorbing pads 15A & 15B as confiningly housed within the confining zone 15C. Although the shock dissipating pads 15P may also possess a certain degree of compression and shock absorbing properties, their primarily function serves to redistribute the unequal tangential forces exerted by wheels 21A & 21B onto the shock absorbing section 15 by providing a substantially uniform distribution and transfer of the impacting energy onto the shock absorbing pads 15A & 15B. The shock dissipating pads 15P may accordingly be of a substantially firm construction. A host of solid thermoset and thermo plastic materials as well as other cellulosic and metallic materials may be used to provide the substantially firm construction for the dissipating pads 15P. As may be further observed from the Figures, the shock dissipating pads 15P are depicted as being slideably engaged and housed within guide track 7 so as to slideably move in unison with the movement of tracking wheels 21A & 21B. If sliding blocks 21A & 21B (not shown) of a size mating onto pads 15A & 15B were mounted to the carriage member 20 instead of the tracking wheels 21A & 21B, then such sliding blocks 15A & 15B would serve the dual purpose as the tracking members 21 as well as the shock dissipating pads 15P.

Significantly enhanced shock absorbing efficacy may be achieved by utilizing shock absorbing pads 15A & 15B which have a capacity to compress with sufficient resistance so as to absorb a major portion of the impacting force and sufficient resilient memory to responsively decompress onto an uncompressed or resting position after absorbing an impacting force. The shock absorbing efficacy may be reflected by the actual distance the carriage 20 moves to substantially retard the impacting force transferred onto an object transported upon carriage 20. As previously indicated, the decompression of an impacted pad 15A & 15B may not completely absorb the initial quantum of the impacting energy exerted against any given pad 15A & 15B. Consequently, the residual unabsorbed impacting force may force the carriage unit 20 against the initiating direction of the original impacting force whereupon the oppositely positioned pad 15A & 15B will then further absorb and dampen the impacting shock excesses.

The efficacy of the seat shock absorbing module 1 relies upon a combination of factors to provide a shock absorbing system which may be effectively adapted for use in the most demanding operational conditions. Vehicular units V designed for use in relatively uneven terrain with abrupt turning and braking (e.g. such as sharp radius turning lawn mowers, skid steers, etc.) necessitate a highly delicate shock absorbing module 15 for safe operation. If the shock absorbing module 1 is overly responsive or excessively slow to effectively respond to an impacting force, unsafe vehicular operational conditions may inevitable arise. The present invention corrects the defectiveness of conventional shock absorbing systems by providing the precise quantum and precise level of shock absorbing efficacy for effective and safe operational use of vehicles under the most demanding impacting shock vehicular conditions.

Since there also exists a wide variation in operational thermal conditions (e.g. 50° F. to 125° F.) of vehicular use, the more effective compressive pads 15A & 15B utilize an elastomeric material which retains its operational efficacy without any substantial diminution of the shock absorbing capacity due to temperature fluctuations. The compressive pads 15A & 15B should also characteristically possess sufficient compressibility to repetitively absorb the impacting force without any substantial attrition of the shock absorbing capacity while also affording sufficient elasticity to responsively and repetitively return the pads 15A & 15B to their original uncompressed form. The ability to absorb a substantial quantum of impacting force is reflected by the flexural yield strength and shore hardness values coupled with the compressive pads 15A & 15B ability to elastically decompress and return to their original uncompressed form, which factors significantly enhance the shock absorbing efficacy of the shock absorbing module 1. In addition to possessing sufficient hardness to absorb the impacting shock, the flexure strength (measurement of resistance to deformation when placed under load) should be sufficiently high in value so as to provide adequate compressive pad resistance to effectively absorb the impacting force.

An elastomeric material particularly well suited for use as shock absorbing pads 15A & 15B is an elastomer classified is a medium density closed cell, low compression set silicone rubber (item # DSA 1135-500 sold and distributed by Midwest Rubber Service and Supply Co., 14307 20$^{th}$ Place N, Plymouth Minn., 65447), which when used in the shock absorbing section 15, provides exceptional shock absorbing efficacy for the shock absorbing module 1 of this invention. This particular silicone rubber product is commercially available in 36 inch wide and ½ inch thick rolls from which the shock absorbing pads 15A & 15B may be cut into the appropriate pad 15A & 15B size. As previously indicated, shock absorbing pads 15A & 15B of relatively small dimensions (e.g. measuring 0.5" depth×1.35"w×2.125" length) when used in the shock absorbing section 15 (as illustrated in the Figures) provide an exceptional capacity to effectively absorb and dampen or cushion the effects of sever impacting forces exerted against the carriage unit 20 and shock absorbing module 1 herein. The following table further illustrates the extreme low and high temperatures, high compressibility, the very low compression set, tensile strength and elongation characteristic of the aforementioned silicone rubber product which features contribute to the unexpectedly superior shock absorbing efficacy of pads 15A & 15B in the seat shock absorbing module 1.

| TEST | PROPERTIES | ASTMD TEST |
|---|---|---|
| Density over ¼" thick | 0.018 lbs/in$^3$ | 056 |
| Compression deflection | 11 psi | 575 |
| Compression Set, 22 hrs @ 212° F. | 29 | 397 |
| Max Compression Set, 22 hrs @ 212° F. | 60% | 395 |
| Temperature Range | −103 to 450° F. | 573 |
| Tensile Strength | 100 psi | 412 |
| Elongation | 200% | 412 |

Wheels 21A & 21B, if of a metallic construction, may tend to create an annoying noise when used in combination with a metallic track 7. This noise problem may be readily alleviated by using materials of a non-metallic construction at the interface of guide rails 7A & 7B or by the use of plastic rollers (e.g. high molecular weight polyethylene such as VHMW-PE) as the carriage wheels 21A & 21B. The carriage frame 23, the support frame 3 and the retaining bracket 15R depicted in the Figures may be appropriately manufactured from a durable steel plate stock (e.g. 10 gauge) fabricated into the desired structural design by conventional metal stamping and forming techniques. If desired, reinforcement ribbings 22 may be stamped or punched into the basic frame structure (e.g. the carriage frame 23) to add structural strength. Although the size and shape of the module 1 may vary for different applications, appropriate dimensional specifications and materials for the various components of the shock absorbing module 1 for a one person seat (e.g. garden tractor seat) have been more comprehensively disclosed in my co-pending provisional application (Ser. No. 61/340,905) which application is incorporated herein and made a part of this non-provisional patent application.

The shock absorbing section 15 may be provided in different forms, all of which will typically involve a slideable carriage unit 20 of a limited or restricted range of movement. This limited shock absorption movement becomes feasible because of juxtapositional relationship of the effective shock absorbing sections 15 to the tracking members 21 which concurrently channels the carriage movement onto the shock absorbing section 15. Consequently, the carriage unit 20 movement or travel distance is restrictively limited to the extent the shock absorbing section 15 compresses and decompresses in response to an impacting shock within track 7. This feature significantly alleviates the stress and the impacting percussions as perceived and inflicted upon the vehicular operator.

Figure 20:
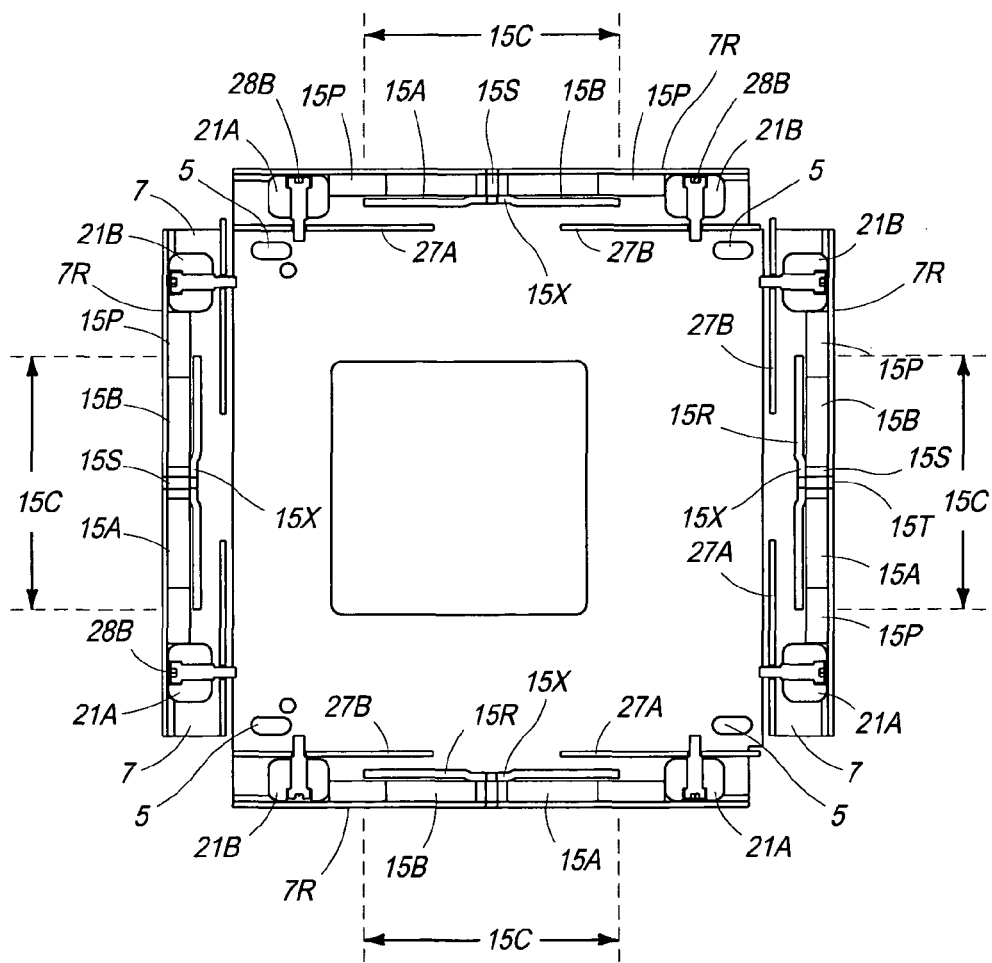
FIG. 20 is a cross-sectional top view of a vehicular shock absorbing module adapted to absorb multidirectional shocks including sideway impacting vehicular shocks as well as those arising from forwardly and rearwardly impacting forces.

The seat S provides mounts 25 for mounting the seat S to shock absorbing module 1. The mounted seat S carried by the carriage unit 20 as generally depicted in FIG. 20, serves to unitarily transfer the impacting shock to the shock absorbing section 15. The shock absorbing module 1 will rely upon at least one shock absorbing unit 15 which includes at least two compressible and decompressible shock absorbing members 15A & 15B positioned in opposing directions and positioned against stops 15S so that each shock absorbing member 15A & 15B will independently operate as a separate shock absorbing section 15. Without any advantage, the shock absorbing members 15A & 15B need not be housed within a single track 7. In such an alternative arrangement, two oppositely facing shock sections 15 confined within separate tracks equipped with limited carriage track age (as depicted by the straddling carriage 20) could be used to separately house shock absorbing pads 15A & 15B. The paired shock absorbing members 15A & 15B generally rely upon a confined region 15C within which members 15A & 15B will undergo their respective compression and decompression in response to the impacting forces. The retaining bracket 15R, the side rail 7R and track 7 collectively likewise serve to retain and direct the shock absorbing sections 15 such as the elastomeric pads 15A & 15B in an appropriate shock absorbing position.

Although the use of elastomeric pads 15A & 15B as explained above provide unexpectedly superior efficacy in retardation of the effects of vehicular impacts, other mechanical or hydraulic operating systems independently adapted to the shock absorbing sections 15 may be utilized herein to achieve a lesser degree of overall shock absorbing efficacy. The elastomeric pads 15A & 15B may be accordingly replaced with other resilient mechanical members (e.g. springs, pneumatic and hydraulic cylinders etc.) utilizing the same cooperative elements as required by the pads 15A & 15B. As with elastomeric pads 15A & 15B, the shock induced onto the seat S will accordingly be substantially simultaneously transferred from the seat S and concomitant carriage 20 movement onto the compressive action of the shock absorbing sections 15 such as accomplished by the positioning of wheels 21A & 21B in juxtaposition to the shock absorbing section 15. Accordingly, if springs 15A & 15B were used instead of the elastomeric pads 15A & 15B, the spring replacements 15A & 15B would correspondedly utilize a housing or confining zone 15C and a stop 15S to retain the springs 15A & 15B in proper position for directly receiving and absorbing an impacting force from opposite directions via the compressing and decompressing thereof. The compressive movement of the springs and concomitant movement of the carriage 20 will accordingly be of a relatively restricted range as effectuated by elastomeric pads 15A & 15B. For example, at least two housings such distal closed ended cylinders placed in a butt to butt relationship could be used to serve as confining zone 15C. When springs 15A & 15B are used instead of elastomeric pads 15A & 15B, the carriage member 20 would accordingly be slideably mounted to track guide 7 which in turn would provide for the concurrent transfer of the impacting carriage movement to springs 15A & 15B. Such springs 15A & 15B could also be similarly placed in the guide track 7 as depicted by the elastomeric pads 15A & 15B in the Figures. Alternatively, the housed springs 15A & 15B may independently utilize the housing or the guide track 7 and rely upon rodded plungers pivotally connected to support frame 3 so as to thereby permit the compression and decompression of springs 15A & 15B upon slideable movement of carriage member thereupon.

The shock absorbing module 1 may rely upon multiple positioned shock absorbing sections 15 positioned at varying angular positions to absorb shocks arising from two more directions such as a backward and forward shock absorbers or from multiple traverse directions such as exemplified by FIG. 20. FIG. 20 depicts a multidirectional shock absorbing module 1 adapted to absorb impacting shocks emanating from four different directions, namely forward and backward as well as those emanating from the left side and the right side of the vehicular support S for transporting objects therewith. As may be observed from FIG. 20, each shock absorbing section 15 relies upon the same modular component parts (which are adapted to absorb shocks longitudinally along a plane from opposite directions) as depicted in the shock absorbing module 1 of FIGS. 1-3, 16A-18A and 16-18, except for the addition of two laterally disposed shock absorbing sections each equipped with elastomeric pads 15A & 15B transversely positioned in a perpendicular relationship to the position of shock absorbing sections 15A & 15B shown in FIGS. 2 and 16-18. The perpendicular placement of shock absorbing sections 15 of FIG. 20 in combination with shock absorbing sections 15A & 15B allows the shock absorbing section 15 and seat S to be responsive to shocks emanating from sideway impacts on both seat sides as well as those arising from the backward and forward shocks.

Although a single shock absorbing section 15 may be utilized to absorb shock emanating from opposite directions, the use of two laterally aligned shock absorbing sections 15 (as typified the modules depicted in the Figures) to absorb oppositely directed impacting forces more uniformly dissipates the shock effect and optimizes the shock absorbing efficacy of the shock absorbing module 1. As may be visualized from the FIG. 20 cross-sectional view, multidirectional shock absorbing module 1 emanating from multiple impacting planes and positioned at varying arcuate positions may be utilized to absorb a plurality of oppositely directed impacting forces radially emanating from different radially impacting sources simply by a radial positioning of a plurality of the shock absorbing sections 15 at different radial positions or quadrants within the shock absorbing module 1. For example, if multiple shock absorbing sections 15 were arranged about a radial arc, impacting shocks emanating about a 360 degree arc could be incorporated into the design of a single shock absorbing module 1 such as by placement of a shock absorbing section 15 at every 30 degree interval. Since the shock absorbing module 1 when equipped in its basic form to absorb oppositely directed impacting forces (e.g. such as the forward and rearward impacting forces) provides such a substantial reduction in a vehicular occupant's perception of shock impacts as well as actual effect of the impacting force, the modular shock absorbing advantage will not normally justify the added expense of incorporating more than four shock absorbing sections 15 into a single shock absorbing module 1. Two laterally displaced shock absorbing equipped with the forward and aft shock absorbing members 15A & 15B will typically suffice for most vehicular applications. Certain other applications requiring the highest degree of impacting shock absorption may, however, justify the additional expense to use four or more shock absorbing sections 15. Another manner in which impacting forces emanating from transverse planes such as the sideway and backward-forward absorption of impacting forces as provided by the FIG. 20 module 1 may simply involve stacking of one shock absorbing module 1 on top of another shock absorbing module 1 in a transverse or perpendicular relationship so as to provide the multi-positional shock absorbing relationships as illustrated by FIG. 20.

The shock absorbing module 1 of this invention generally applies to a vehicular shock absorber system supportive of any occupying supportive site or occupying position of a vehicular passenger or material. The shock absorbing module 1 of this invention may also be readily adapted to effectively absorb impacting shocks encountered by any vehicular passenger resting or riding in an occupant's occupying site during transit. The shock absorbing module 1 may be adapted to an occupant riding in either a seated or prone position. Fragile vehicular transported materials or items may be supportively protected against excessive movement, breakage or damage by mounting the shock absorbing module 1 on a vehicular platform which supports the transported goods. The shock absorbing module 1 may be accordingly applied broadly to a host of materials which may, because of their delicate structure, require a damping of vehicular impacting shocks. The shock absorbing module 1 may accordingly be used in combination with any vehicular supportive structure which would benefit from its superior vehicular shock absorbent attributes. Although vehicular passengers are customarily in a seated position, certain vehicles used to transport medically handicapped persons or patients, often transport such passengers in a prone position such as in a bed, stretcher, gurney, etc. may be applied to the shock absorbing module 1 herein. Ambulances are notoriously recognized as affording only nominal protection against the hazardous effects of impacting vehicular shocks because of their need for "heavy springs". This problem becomes particularly acute when transporting severely injured or sick ambulance patients in which the impacting shocks results in increased health risks or further aggravation of an already serious or precarious medical condition.

Similar to the use of the shock absorbing module 1 to absorb seat impacted shocks, the support frame 3 may be appropriately mounted to a vehicular chassis V and the carriage member 20 mounted to a vehicular occupant's occupancy site (e.g. such as a seat, platform, bed frame, gurney etc.) along with the shock absorbing section 15 and guide track 7 appropriately positioned therewithin so as to effectively absorb the impacting shock, generally in the same manner as when the shock absorbing module 1 is used to absorb impacting shocks impacted upon a vehicular seat S. When the shock absorbing module 1 is used for a gurney, the gurney itself may serve as the vehicular chassis mount for the support frame 3 with the gurney bed support structure serving as a mount for the carriage member 20 thereto. Alternatively, the gurney may be supported by a platform to which the carriage member 20 is attached with the support frame 3 accordingly being attached to the vehicular chassis V to provide a shock absorbing platform for the gurney.

What is claimed is:

1. A vehicular shock absorbing module equipped to responsively dampen and absorb impacting shocks emanating from multiple impacting directions exerted against a vehicular support for transporting vehicular objects, said shock absorbing module comprising:
   A) a support frame equipped with:
      1) a chassis mount for mounting the support frame to a vehicular chassis of a vehicle;
      2) a shock absorbing section mounted to said frame with said shock absorbing section including at least two counter positioned resilient shock absorbing members equipped with an abutting rigid stop so as to permit each of said shock absorbing members to independently compress towards the stop in response to an impacting force directed towards the shock absorbing members and thereafter relax into an uncompressed position; and
      3) a guide track positioned in longitudinal alignment with said shock absorbing members; and
   B) a carriage unit slideably mounted onto the guide track with said carriage unit including:
      1) a carriage frame;
      2) a support mount for mounting the vehicular support to the carriage frame; and
      3) tracking members respectively affixed onto said carriage frame so as to slideably track onto said guide track with each of said tracking members being positioned in a juxtapositional operational relationship to each impacting face of said shock absorbing section so as to concurrently transfer upon impact the impacting force exerted against the carriage frame onto said shock absorbing members of said shock absorbing section.

2. The module according to claim 1 wherein the at least two counter positioned resilient shock absorbing members are longitudinally separated within the guide track by the rigid stop.

3. The shock absorbing module according to claim 1 wherein the vehicular support consists of a supportive structure for transporting a person with said vehicle, the guide track includes at least two laterally positioned guide tracks to accommodate at least two shock absorbing sections with each of said shock absorbing sections consisting essentially of a pair of oppositely positioned elastomeric pads separated by the rigid stop and longitudinally aligned within said track in a directional alignment with an operational direction of movement of the vehicle.

4. The shock absorbing module according to claim 1 wherein the module consists essentially of a seat shock absorbing module, the support mount includes a seat mount, for mounting a vehicular seat to the carriage frame, the shock absorbing members include a pair of elastomeric pads operationally confined within the guide track, with each of said pads being oppositely positioned from said rigid stop, the tracking members consist essentially of paired rollers mounted onto said carriage member in an interfacing operational contacting position at opposite impacting ends of the shock absorbing section so as to permit a roller of the paired rollers facing the impacting force to concurrently transfer upon impact the impacting force exerted upon the carriage unit onto the shock absorbing section.

5. The unit according to claim 4 wherein the rollers consist of plastic wheels.

6. The module according to claim 4 wherein the shock absorbing section includes a pair of shock dissipating members interfacially contacting onto each of said rollers and said elastomeric pads so as to uniformly transfer and dissipate upon the impacting force exerted by each of said rollers onto said shock absorbing elastomeric pads.

7. The shock absorbing module according to claim 4 wherein the pair of elastomeric pads consist essentially of a paired set of elastomeric pads secured onto a side rail of the guide track with a retaining bracket which collectively serves to directionally restrain the compression and decompression of the elastomeric pads within confinement of said rail, said retaining bracket and said rigid stop.

8. A vehicular seat shock absorbing module which when operationally attached to a seat and a chassis of a vehicle, effectively cushions and dampens the effect of an impacting force exerted against said seat, said seat shock absorbing module comprising at least one shock absorbing section having at least two oppositely positioned resilient elastomeric shock absorbing members separated by a rigid stop and confined within a guide track so as to thereby directionally restrain an impacting compression and decompression of the elastomeric member therewithin, with said guide track being supported by a support frame equipped with vehicular chassis mounts for mounting the module to the vehicle, and a slideable carriage member equipped to mount a seat thereto and slideable tracking members saddling onto the shock absorbing section and tracking onto the guide track.

9. The seat shock absorbing module according to claim 8 wherein the seat and the chassis of the vehicle are respectively mounted to the carriage member and the frame.

10. The seat shock absorbing module of claim 9 wherein the tracking members comprise tracking wheels positionally mounted onto the carriage member so as to interfacially engage onto each end of the shock absorbing section.

11. The seat shock absorbing module according to claim 10 wherein the shock absorbing section consists essentially of a pair of elastomeric pads each interfacing at one pad end onto a rigid stop and at an opposite pad end onto a shock dissipating pad with each of the tracking wheels being interfacially positioned onto each dissipating pad so as to permit one of the tracking wheels facing the impacting force to exert a concurrent transfer of an impacting movement of the carriage member onto the shock dissipating pads.

12. The seat shock absorbing module of claim 11 wherein a retaining bracket serves to confine the elastomeric pads within the guide track when a compressive force is exerted upon the elastomeric pads by the impacting force.

13. The seat shock absorbing module according to claim 12 wherein said module includes two laterally positioned guide tracks, with each of the guide tracks being equipped with the shock absorbing section saddled by the tracking wheels.

14. The module according to claim 13 wherein the tracking wheels consist of plastic wheels and each of the shock absorbing sections include a pair of shock dissipating pads interfacing onto the plastic wheels so as to permit the tracking wheels facing the impacting force to concurrently transfer the impacting movement of the slideable carriage onto the elastomeric pads.

15. The module according to claim 14 wherein the elastomeric pads consists essentially of a medium density closed cell and a low compression silicon rubber.

16. A vehicular shock absorbing combination comprising:
   A) a vehicular support for transporting vehicular objects carried by a transporting vehicle;
   B) a vehicular chassis mount for mounting the vehicular support to a vehicular chassis of a vehicle;
   C) a vehicular shock absorbing module equipped to responsively dampen and absorb impacting shocks emanating from multiple impacting directions exerted against said shock absorbing module comprising:
      1) a modular support frame mounted to the vehicular chassis mount;
      2) a shock absorbing section mounted to said frame with said shock absorbing section including at least two counterpositioned resilient shock absorbing members equipped with an abutting rigid stop so as to permit each of said shock absorbing members to independently compress towards the stop in response to an impacting force directed towards the shock absorbing members and thereafter relax into an uncompressed position; and
      3) a guide track positioned in longitudinal alignment with said shock absorbing members; and
      4) a carriage unit slideably mounted onto the guide track with said carriage unit including:
         a) a carriage frame;
         b) a support mount for mounting the vehicular support to the carriage frame; and
         c) tracking members respectively affixed onto said carriage frame so as to slideably track onto said guide track with each of said tracking members being positioned in a juxtapositional operational relationship to each impacting face of said shock absorbing section so as to permit each of the tracking members facing the impacting force to concurrently transfer upon impact the impacting force exerted against the carriage frame onto said shock absorbing members of said shock absorbing section.

17. The combination according to claim 16 wherein the guide track consists essentially of two laterally positioned guide tracks each of which being equipped with two elastomeric pads as the shock absorbing members operationally confined within each of the guide tracks and longitudinally separated therewithin by the rigid stop with said elastomeric pads being characterized as possessing sufficient resistance against elastomeric compression to absorb the impacting force and thereafter decompress into the uncompressed position.

18. The vehicular shock absorbing combination according to claim 17 wherein the module consists essentially of a seat shock absorbing module, the support mount includes a seat mount for mounting a vehicular seat to the carriage frame, with the two elastomeric pads operationally confined within each of the guide tracks being separated by said rigid stop, the tracking members consist essentially of paired rollers mounted onto said carriage member in an interfacing operational contacting position at opposite impacting ends of the shock absorbing section so as to permit each of the paired rollers facing the impacting force to concurrently transfer the impacting force exerted upon the carriage member onto the shock absorbing section.

19. The combination according to claim 18 wherein the paired rollers consist of plastic wheels and each of the shock absorbing sections include a pair of shock dissipating members interfacially contacting onto each of said plastic rollers and said elastomeric pads so as to uniformly transfer and dissipate the impacting force exerted by said plastic wheels onto said shock absorbing elastomeric pads.

20. A vehicular seat shock absorbing module which when operationally attached to a seat and a chassis of a vehicle, effectively cushions and dampens an impacting force exerted against said seat, said seat shock absorbing module comprising at least one shock absorbing section having at least two oppositely positioned resilient shock absorbing elastomeric pads separated by an abutting rigid stop, with said elastomeric pads confined within a guide track so as to permit each of said pads to independently compress towards the stop in response to the impacting force exerted thereupon and thereafter relax into an uncompressed position with said guide track being supported by a support frame equipped with vehicular chassis mounts for mounting the module to the vehicle, and a slideable carriage member equipped with a seat mount for mounting the seat thereto and slideable tracking members saddling onto the shock absorbing section and tracking within the guide track so as to cushion and dampen the impact forces exerted thereupon.

* * * * *